US006713751B2

(12) United States Patent
Muramatsu et al.

(10) Patent No.: US 6,713,751 B2
(45) Date of Patent: Mar. 30, 2004

(54) EASILY ASSEMBLED OPTICAL FIBER SENSOR AND MUSICAL INSTRUMENT USING THE SAME

(75) Inventors: Shigeru Muramatsu, Shizuoka (JP); Tsutomu Sasaki, Shizuoka (JP)

(73) Assignee: Yamaha Corporation (JP)

( * ) Notice: Subject to any disclaimer, the term of this patent is extended or adjusted under 35 U.S.C. 154(b) by 184 days.

(21) Appl. No.: 09/998,522

(22) Filed: Nov. 29, 2001

(65) Prior Publication Data

US 2002/0062728 A1 May 30, 2002

(30) Foreign Application Priority Data

Nov. 30, 2000 (JP) ....................................... 2000-365962

(51) Int. Cl.[7] ............................ G06M 7/00; G01H 3/06

(52) U.S. Cl. .......................... 250/221; 250/229; 84/639; 84/724; 84/744

(58) Field of Search ........................... 250/214 PR, 221, 250/222.1, 229; 200/332; 84/13, 20, 21, 639, 640, 723, 724, 744, 745; 385/88, 90–92, 139; 341/13

(56) References Cited

U.S. PATENT DOCUMENTS

| | | | | | |
|---|---|---|---|---|---|
| 4,736,662 | A | * | 4/1988 | Yamamoto | 84/724 |
| 5,237,123 | A | * | 8/1993 | Miller | 84/21 |
| 5,379,362 | A | * | 1/1995 | Kawamura | 385/92 |
| 5,804,816 | A | | 9/1998 | Yamamoto et al. | 250/221 |
| 5,909,028 | A | * | 6/1999 | Yamamoto | 250/221 |
| 6,420,642 | B1 | * | 7/2002 | Muramatsu et al. | 84/724 |
| 2001/0024553 | A1 | * | 9/2001 | Nakanishi et al. | 385/94 |

* cited by examiner

*Primary Examiner*—Stephone B. Allen
(74) *Attorney, Agent, or Firm*—Dickstein, Shapiro, Morin & Oshinsky, LLP.

(57) ABSTRACT

An array of optical fiber sensors is installed in an automatic player piano for monitoring the hammers, and a data processing system produces music data codes through the analysis on the current hammer positions reported by the optical fiber sensors, wherein each optical fiber sensor has a sensor head separable into a head body and a holder so that an assembling worker fixes the optical fiber to the sensor head by pressing the optical fiber to the head body with the holder.

17 Claims, 10 Drawing Sheets

EASILY ASSEMBLED OPTICAL FIBER SENSOR AND MUSICAL INSTRUMENT USING THE SAME

FIELD OF THE INVENTION

This invention relates to an optical sensor preferable for a musical instrument and, more particularly, to an optical sensor for producing an electric signal representative of a current position of a moving object and a musical instrument equipped with an array of the optical fiber sensors.

DESCRIPTION OF THE RELATED ART

There are several types of a composite keyboard musical instrument. A composite keyboard musical instrument is known as an automatic player piano, and another composite keyboard musical instrument is called as "silent piano". In the following description, word "lateral" is indicative of the direction in which black keys and white keys are arranged on the well-known pattern employed in the standard acoustic piano. Word "perpendicular" is indicative of the direction crossing the lateral direction at 90 degrees.

The automatic player piano is the combination of an acoustic piano and an electric system for an automatic playing and recording. The electric system includes an array of solenoid-operated key actuators, an array of key sensors and a data processing system. The array of solenoid-operated is usually provided in a space formed in the key bed under the rear portions of the black/white keys, and the array of key sensors is placed on the key bed under the front portions of the black/white keys. A user is assumed to instruct the data processing system to record his performance on the keyboard. While the user is playing a piece of music on the keyboard, the key sensors periodically report the current key positions to the data processing system. The data processing system specifies the times at which the black/white keys are depressed and released, and estimates the loudness of the tones. The data processing system stores these pieces of music data information in music data codes, and records the music data codes representative of the performance in a suitable memory. When the user requests the data processing system to reproduce the tones, the data processing system reads out the music data codes, and determines times to move the black and white keys as well as the values to the key velocity to be imparted to the black and white keys. The data processing system sequentially supplies driving current signals to the solenoid-operated keys at the appropriate timings. Then, the solenoid-operated keys give rise to key motions so as to reproduce the tones.

The silent piano is the combination of an acoustic piano, a hammer stopper and an electronic tone generating system. When a user changes the hammer stopper to a free position, the hammer stopper is moved out of the trajectories of the hammers. While the user is fingering a piece of music on the keyboard, the depressed black/white keys give rise to free rotation of the hammers, and the hammers strike the associated strings so as to generate the piano tones. Thus, the silent piano behaves as an acoustic piano. The user is assumed to change the hammer stopper to a blocking position, the hammer stopper enters the trajectories of the hammers. After the entry into the blocking position, although the depressed key makes the action mechanism escape from the associated hammer, the hammer rebounds on the hammer stopper before striking the string. Any piano tone is not generated from the string. However, the electronic tone generating system produces electronic tones instead of the piano tones. The electronic tone generating system has an array of key sensors, a data processing system and a sound system. While the user is fingering a piece of music on the keyboard, the key sensors periodically report the current key positions of the associated black and white keys to the data processing system. The data processing system specifies the depressed keys and the released keys, and estimates the loudness of the tones. The data processing system stores these pieces of music data information in music data codes, and produces an audio signal from the music data codes. The audio signal is supplied to the sound system, and the sound system such as a headphone converts the audio signal to the electronic tones.

The key sensors may be replaced with hammer sensors. In this instance, the hammer sensors periodically report the current hammer positions to the data processing system, and the data processing system produces the music data codes on the basis of the hammer motion. Thus, the key sensors or the hammer sensors are indispensable components of the composite keyboard musical instrument.

Various kinds of key/hammer sensors have been employed in the composite keyboard musical instrument. Photo-couplers and optical fiber sensors are popular among the manufacturers. The photo-coupler, i.e., a light emitting element and a light detecting are provided on both sides of the trajectory of the associated black/white key, and a light beam is radiated from the light emitting element to the light detecting element across the trajectory of the associated black/white key. A shutter plate is fixed to the lower surface of the associated black/white key, and the shutter plate interrupts the light beam at predetermined points on the trajectory. The light detecting element converts the amount of light incident thereon to photo-current, and the key/hammer position is represented by the potential level converted from the photo-current. The potential level is further converted to a binary value of a digital signal, and the digital signal is supplied to the data processing system as the key/hammer position signal.

The photo-coupler is required for each of the black/white keys or each of the hammers. Eighty-eight keys usually form the keyboard. Accordingly, eighty-eight photo-couplers are to be installed in the narrow space between the key bed and the black/white keys or inside the piano case as close to the strings as possible. Although each photo-coupler is small in volume, the array of eighty-eight keys occupies a substantial amount of space. This results in complicated arrangement inside the piano case.

The optical fiber sensor was proposed in order to make the internal arrangement simple. The optical fiber sensor has a multiple-port sensor head connected through optical fibers to a combined optical element serving as a light emitting element and a light detecting element. Only the multiple-port sensor heads are installed inside the piano case, and the combined optical elements are provided in a relatively wide space. For this reason, the optical fiber sensors are preferable for the combined keyboard musical instrument.

FIG. 1 shows a typical example of the key sensor array implemented by the optical fiber sensors. The prior art key sensor array 50 includes plural sensor heads S1, plural shutter plates 52, pairs of optical fibers 55/60 and combined optical elements (not shown). The sensor heads 51 are formed of transparent acrylic resin, and are arranged at intervals in the lateral direction. The shutter plates 52 are respectively fixed to the lower surfaces of the black and white keys 65 of the keyboard, and are movable together with the associated black and white keys. A light emitting port 53 and a light receiving port 54 are formed in each of the sensor heads 51, and are laterally directed.

As will be better seen in FIG. 2, the sensor heads 51 has a pair of shoulder portions 51*a*, a bulk portion 51*b* and a neck portion 51*c*. The neck portion 51*c* is narrower than the bulk portion 51*b*, and the shoulder portions 51*a* are formed on the steps between the neck portion 51*c* and the bulk portion 51*b*. Lenses 57/58 are fixed to the perpendicular surfaces of the shoulder portions 51*a*, respectively, and slant surfaces 59 are formed in the shoulder portions 51*a*. The lens 57 and the shoulder portion 51*a* form the light emitting port 53, and the other lens 58 and the shoulder portion 51*a* form the light receiving port 54. A pair of holes 61 is further formed in the sensor head 51, and extends from the lateral surface to certain points in the bulk portion 51*b*. The holes 61 extend in the perpendicular direction, and are directed to the slant surfaces 59. The optical fibers 55 and 60 are inserted into the holes 61, respectively, and are fixed to the bulk portion 51*b*. Though not shown in FIG. 2, the combined optical elements are connected to the optical fibers 55/60.

Turning back to FIG. 1, the black and white keys 65 are disposed in the narrow spaces each created between the adjacent two sensor heads 51, and, accordingly, the shutter plates 52 have the trajectories in the narrow spaces, respectively. Each of the sensor heads 50 is shared between the adjacent two key sensors 50, and each prior art key sensor is associated with two of the combined optical elements. The optical fiber 55, a half of the bulk portion 51*b* of a sensor head 51, the light emitting port 53 of the sensor head 51, the light receiving port 54 of the adjacent sensor head 51, a half of the bulk portion 51*b* of the adjacent sensor head 51 and the two combined optical elements form in combination each prior art key sensor.

When a pianist depresses a black/white key 65, the shutter plate 52 is moved together with the depressed black/white key 65 along the trajectory in the narrow space. The combined optical element emits light, and the light is propagated through the optical fiber 55 to the half of the bulk portion 51*b*. The light proceeds in the half of the bulk body 51*b*, and is reflected on the slant surface 59. The light changes the direction, and proceeds to the light emitting port 53. The lens 57 makes parallel light from the reflected light, and the parallel light proceeds to the light receiving port 54 of the adjacent sensor head 51.

The parallel light reaches the light receiving port 54, and the incident light is reflected on the slant surface 59. The light is reflected on the slant surface 59, and is condensed at the end of the optical fiber 60. The light is propagated through the optical fiber 60, and reaches the other combined optical element. The combined optical element converts the light to photo current.

When the shutter plate 52 reaches the optical path between the light emitting port 53 and the light receiving port 54, the shutter plate 65 starts to interrupt the light. While the shutter plate 65 is crossing the optical path, the amount of light incident on the light receiving port 54 is gradually reduced, and, accordingly, the amount of photo current is decreased. Thus, the current position of the black/white key 65 is represented by the amount of photo current.

Only the sensor heads 51 are installed in the narrow space under the black/white keys 65, and make the arrangement in the narrow space simple. However, a problem is encountered in the prior art optical fiber sensor in the assembling work on the optical fibers 55/60 and the sensor head 51. In detail, the optical fibers 55/60 are assembled with the sensor heads 51 as follows. First, the optical fiber 55 is aligned with the hole 61, and inserted into the hole 61 until the leading end is brought into contact with the bottom surface 62. An injector (not shown) is coupled with an injection port 63, and adhesive compound is injected into the injection port 63. The injection port 63 is connected through a passage 64 to the hole 61, and the adhesive compound fills the passage 64. The optical fiber 55 crosses the passage 64 so that the adhesive compound surrounds the leading end portion of the optical fiber 55. When the adhesive compound is solidified, the optical fiber 55 is fixed to the sensor head 51. The other optical fiber 60 is also fixed to the sensor head 51 through the above-described assembling work. Thus, the insertion of the optical fiber 55/60 into the hole 61 and the injection of the adhesive compound are twice repeated for each pair of optical fibers 55/60. The standard keyboard consists of eighty-eight keys. This means that the above-described assembling work is a hundred and seventy-six times repeated for each prior art combined keyboard musical instrument. A large amount of time and labor is consumed, and increases the production cost.

SUMMARY OF THE INVENTION

It is therefore an important object of the present invention to provide an optical fiber sensor, component parts of which are easily assembled thereinto.

It is also an important object of the present invention to provide a musical instrument, which is equipped with an array of the optical fiber sensors so as to reduce the production cost thereof.

To accomplish the object, the present invention proposes to pinch an optical guide member between two parts of a sensor head.

In accordance with one aspect of the present invention, there is provided an optical sensor for converting a current position of a moving object to an electric signal comprising a converting unit generating a light and converting an incident light to the electric signal, an optical guide member connected at one end thereof to the converting unit and propagating the light and the incident light between the aforesaid one end and the other end thereof, a sensor head unit connected to the other end of the optical guide member for radiating the light along an optical path and receiving the incident light and having a first portion formed with a guide path which receives a part of the optical guide member and a second portion pinching the part of the optical guide member together with the first portion, and an optical element fixed to the moving object and moved together with the moving object in such a manner as to cross the optical path for varying the amount of an optical property of the incident light depending upon the current position of the moving object.

In accordance with another aspect of the present invention, there is provided a musical instrument for generating tones comprising plural movable members independently moved by a player, a tone generating system associated with the plural movable members for generating the tones specified by the movable members moved by the player and an array of optical sensors for reporting the movable members manipulated by the player to the tone generating system, and each of the optical sensors of the array comprises a converting unit generating a light and converting an incident light to the electric signal, an optical guide member connected at one end thereof to the converting unit and propagating the light and the incident light between the aforesaid one end and the other end thereof, a sensor head unit connected to the other end of the optical guide member for radiating the light along an optical path and receiving the incident light and having a first portion formed with a guide path which receives a part of the optical guide member and a second portion pinching the part of the optical guide member together with the first portion and an optical element fixed to associated one of the plural movable members and moved together with the associated one of the plural movable members in such a manner as to cross the optical path for varying the amount of an optical property of the incident light depending upon the current position of the associated one of the plural movable members.

BRIEF DESCRIPTION OF THE DRAWINGS

The features and advantages of the optical sensor and the musical instrument will be more clearly understood from the following description taken in conjunction with the accompanying drawings in which.

DESCRIPTION OF THE PREFERRED EMBODIMENTS

First Embodiment

Figure 1:
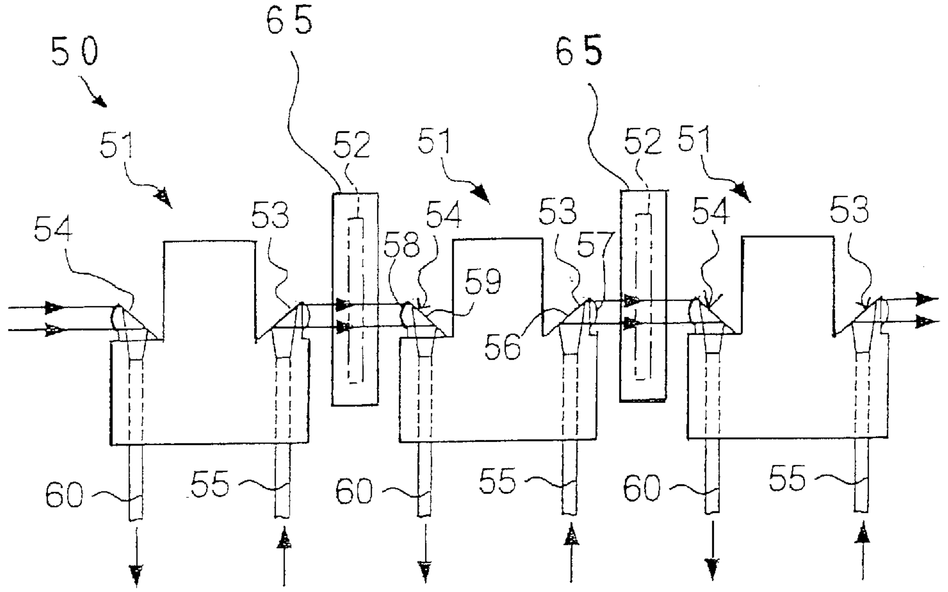
Fig. 1 PRIOR ART
FIG. 1 is a plane view showing the array of the prior art optical fiber sensors.
Figure 2:
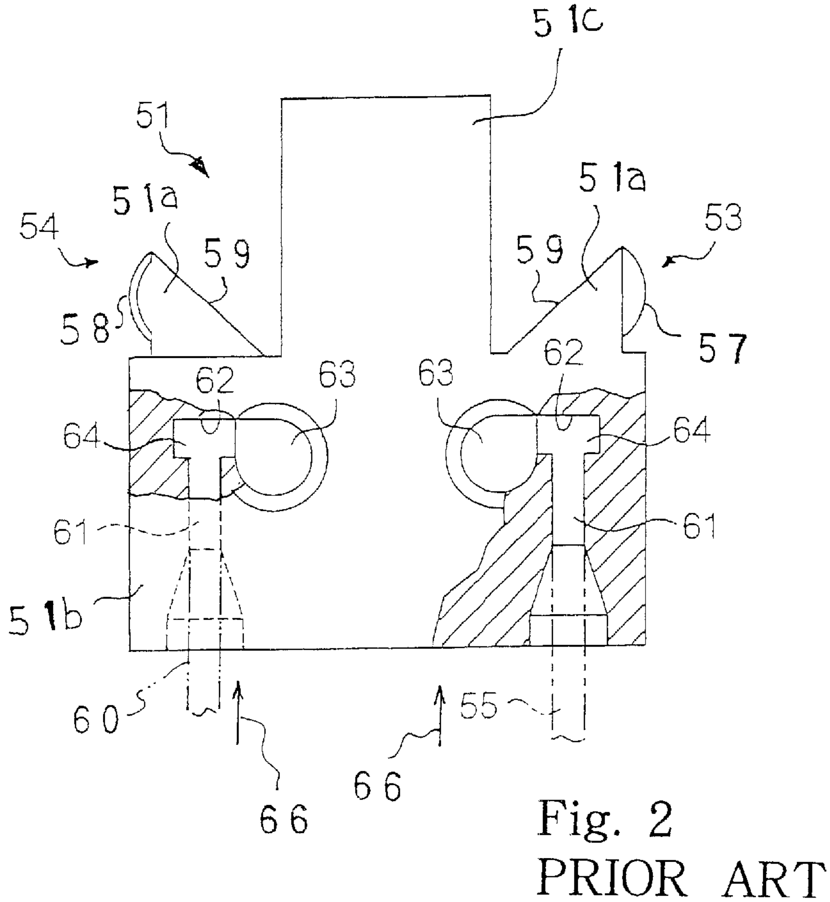
Fig. 2 PRIOR ART
FIG. 2 is a partially cut-away plane view showing the structure of sensor head incorporated in the prior art optical fiber sensor.
Figure 3:
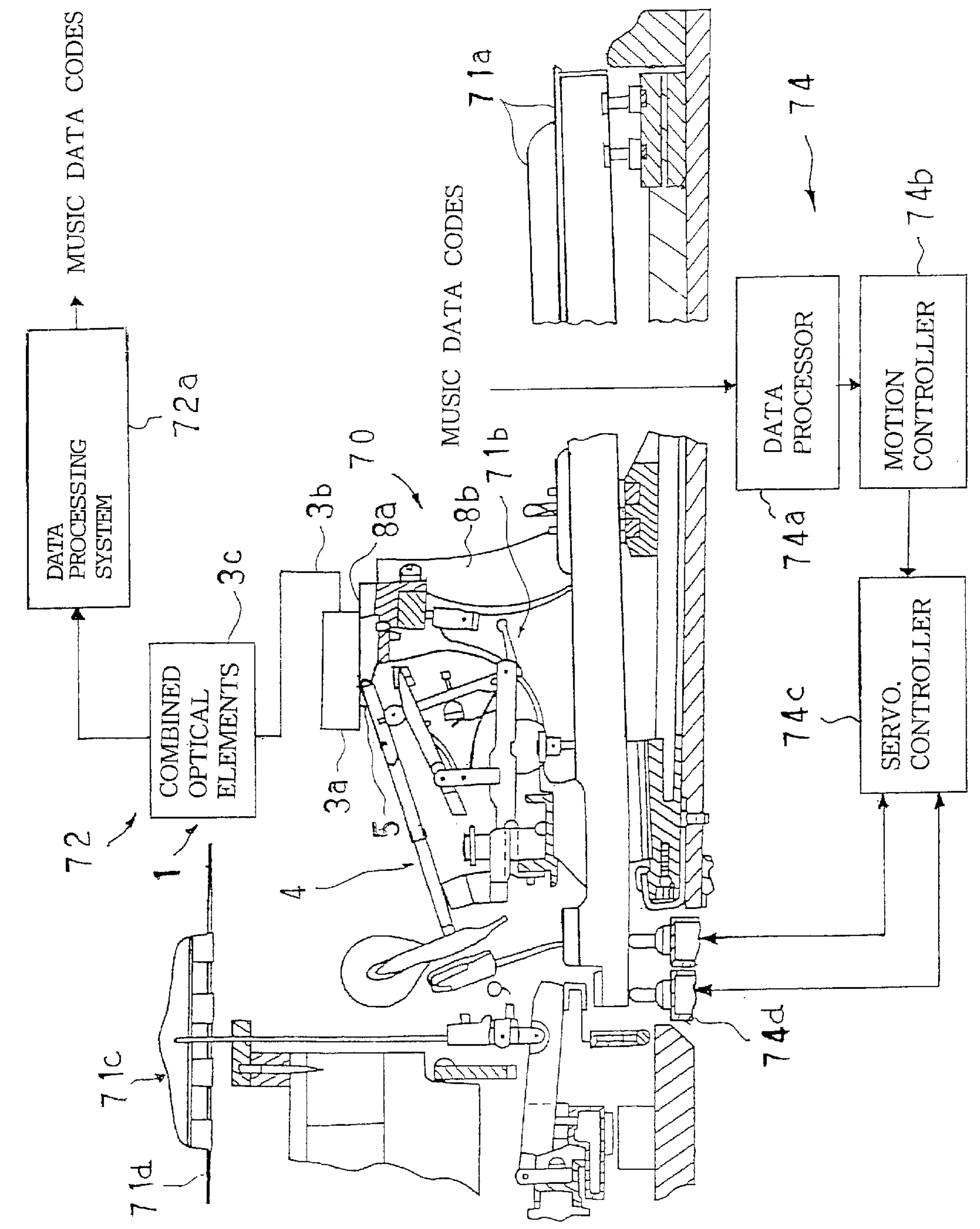
FIG. 3 is a schematic view showing the structure of an automatic player piano according to the present invention.

Referring to FIG. 3 of the drawings, an automatic player piano embodying the present invention is largely comprises an acoustic piano 70, a recording system 72 and an automatic playing system 74. The acoustic piano is a standard grand piano, and comprises eighty-eight black and white keys 71*a*, action mechanisms 71*b*, clampers 71*c*, strings 71*d* and hammer assemblies 4. These component parts 71*a*, 71*b*, 71*c* and 71*d* are assembled in the grand piano 70 as well known in the art, and no further description is hereinbelow incorporated for the sake of simplicity.

The recording system 72 comprises an array of hammer sensors 1 and a data processing system 72*a*. The hammer sensor 1 is implemented by an optical fiber sensor. For this reason, the optical fiber sensor is also labeled with reference numeral 1. The eighty-eight hammer assemblies 4 are monitored by the eighty-eight hammer sensors 1, and the hammer sensors 1 periodically supply hammer position signals to the data processing system 72*a*. The data processing system 72*a* fetches pieces of positional data information stored in the hammer position signals, and stores the pieces of positional data information in a working memory thereof. The data processing system 72*a* analyzes the pieces of positional data information so as to specify the black/white keys 71*a* depressed and released by a pianist and estimate the loudness of piano tones to be produced through the vibrations of the strings 71*d*. The data processing system 72*a* further determines the time at which each black/white key 71*a* is depressed or released. Thus, the data processing system 72*a* obtains pieces of music data information representative of the performance through the analysis on the pieces of positional data information, and produces a set of music data codes also representative of the performance.

The music data codes are supplied to the automatic playing system 74 for selectively rotating the black/white keys 71*a* without fingering. The automatic playing system 74 includes a data processor 74*a*, a motion controller 74*b*, a servo-controller 74*c* and an array of solenoid-operated key actuators 74*d*. The solenoid-operated key actuators 74*d* are respectively provided under the rear portions of the black/white keys 71*a*, and are equipped with built-in velocity sensors. The music data codes are successively supplied to the data processor 74*a*, and the data processor 74*a* instructs the motion controller 74*b* to project and retract the plungers of the solenoid-operated key actuators 74*d* through the servo-controller 74*c*. The servo-controller 74*c* determines a target plunger velocity and the magnitude of a driving signal. When the driving signal is supplied from the servo-controller 74*c* to a solenoid-operated key actuator 74*d*, the solenoid-operated key actuator 74*d* upwardly projects the plunger from the solenoid, and the built-in velocity sensor supplies a feedback signal to the servo-controller 74*c* for reporting the current plunger velocity. The servo-controller 74*c* compares the current plunger velocity with the target plunger velocity to see whether or not the magnitude of the driving signal is appropriate. If the answer is given negative, the servo-controller 74*c* changes the magnitude of the driving signal.

The music data codes are classified into two categories. The music data codes in the first category store pieces of music data information representative of a kind of event such as a note-on event/note-off event, the key code representative of the black/white key 1 to be rotated, the velocity, i.e., the loudness of the tone to be generated and so forth. The music data codes in the second category store control data information representative of a lapse of time from the initiation of a performance at which the event occurs.

Assuming now that a music data code indicates the time at which the associated note-on event is to occur, the data processor 74*a* specifies one of the black/white keys 1 to be rotated on the basis of the key code, and determines a trajectory for the black/white key 71*a*. The data processor 74*a* informs the motion controller 74*b* of the time t to start the rotation and the initial velocity Vr, i.e., coordinate (t, Vr). The motion controller 74*b* determines a series of coordinates on the trajectory, and sequentially supplies the target velocity to the servo-controller 74*c*. The servo-controller 74*c* determines the magnitude of the driving signal, and supplies the driving signal to the associated solenoid-operated key actuator 74*d*. With the driving signal, the solenoid creates the magnetic field, and upwardly projects the plunger. The plunger pushes the rear portion of the associated black/white key 71*a*. The black/white key 71*a* thus pushed by the plunger spaces the clamper 71*c* from the set of strings 71*d*, and gives rise to the rotation of the black/white key 71*a* around the balance rail. The black/white key 71*a* actuates the action mechanism 71*b*, and the hammer 4 is driven for free rotation through the escape of a jack. The hammer 4 strikes the set of strings 71*d*, and the set of strings 71*d* generates the piano tone. The above-described function is repeated for selected black/white keys 71*a* for reproducing the piano tones in the original performance. Thus, the automatic playing system 74 plays a piece of music without any fingering on the keyboard.

As will be understood, the automatic playing system 74 is same as that incorporated in the prior art automatic player piano, and the recording system 72 is similar to the recording system of the prior art automatic player piano except the hammer sensors 1. For this reason, description is hereinbelow focused on the array of the hammer sensors 1.

Figure 4:
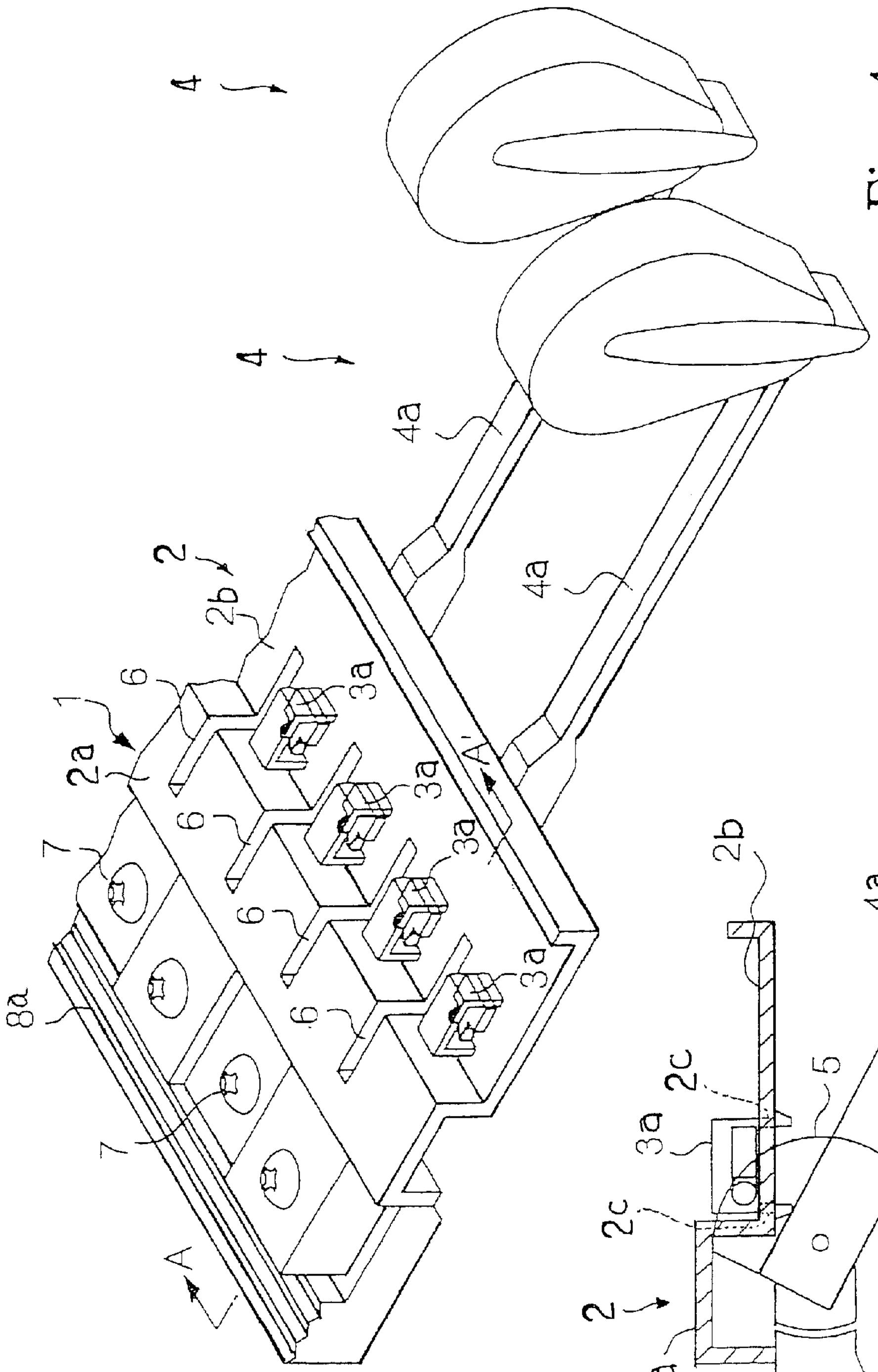
FIG. 4 is a perspective view showing an array of optical fiber sensors incorporated in the automatic player piano.
Figure 5:
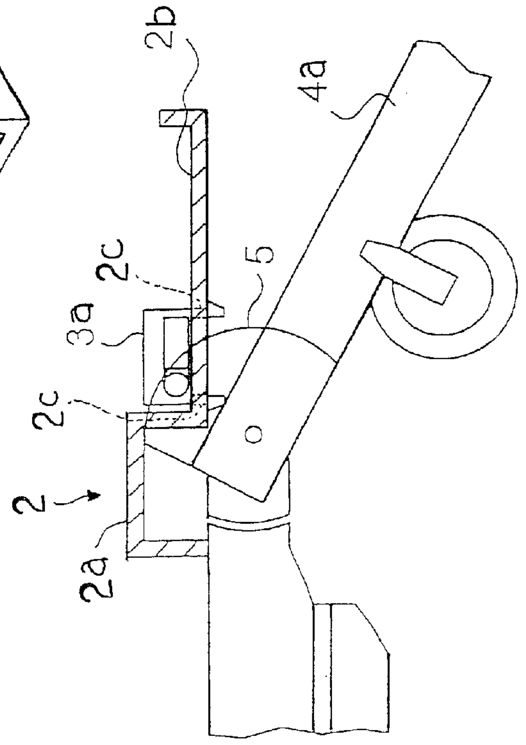
FIG. 5 is a side view taken along line A–A' of FIG. 4 and showing the optical fiber sensor according to the present invention.

The array of the hammer sensors 1 includes sensor heads 3*a*, a bundle 3*b* of optical fibers and combined optical elements 3*c* and photo-filter plates 5. As will be better seen in FIGS. 4 and 5, a base plate 2 is fixed to a shank flange rail 8*a* by means of bolts 7. The shank flange rail 8*a* is supported by action brackets 8*b* (see FIG. 3). The base plate 2 has a hill portion 2*a* and a flat portion 2*b*. Slits 6 are formed in the base plate 2, and extend from the hill portion 2*a* to the flat portion 2*b*. The sensor heads 3*a* are located on the flat portion 2*b* at intervals, and are fixed to the flat portion 2*b*. The slits 6 are open to the intervals, and are associated with the hammer assemblies 4, respectively. Though not shown in FIGS. 4 and 5, the bundle 3*b* of optical fibers is connected between the array of the sensor heads 3*a* and the combined optical elements 3*c*. Each sensor head 3*a* laterally radiates light beams across the gaps over the slits 6 toward the adjacent sensor heads 3*a* on both sides thereof, and receives light beams from the adjacent sensor heads 3*a* as will be described hereinlater in detail.

The photo-filter plate 5 is shaped into a generally sectorial configuration, and is fixed to the hammer shank 4*a* so as to project through the associated slit 6. The light beam passes through the photo-filter plate 5. A gray scale is formed on the photo-filter plate 5, and makes the amount of transmitted light varied together with the angular position of the hammer assembly 4.

Figure 6:
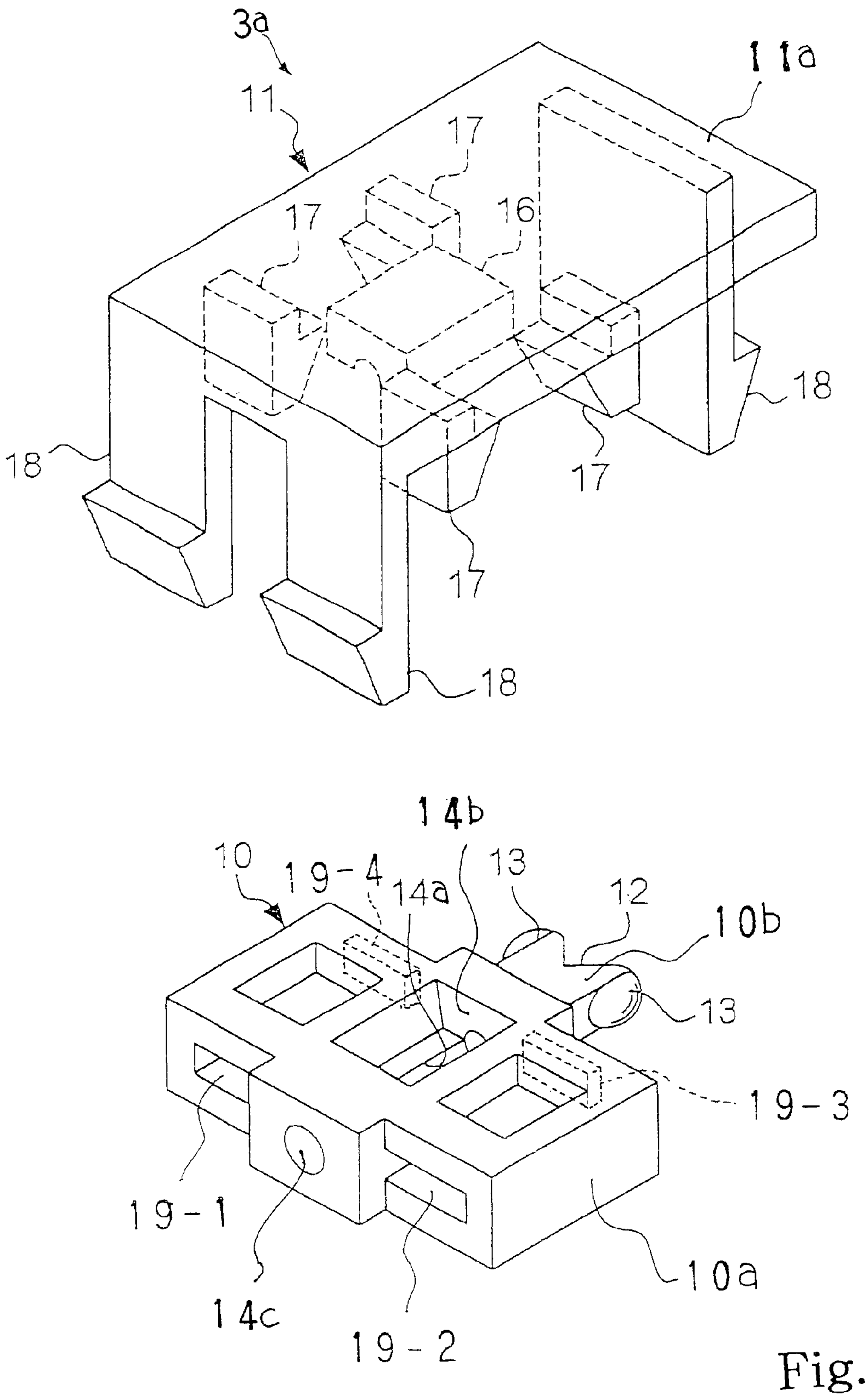
FIG. 6 is a perspective view showing a head body and a holder forming parts of a sensor head.
Figure 7:
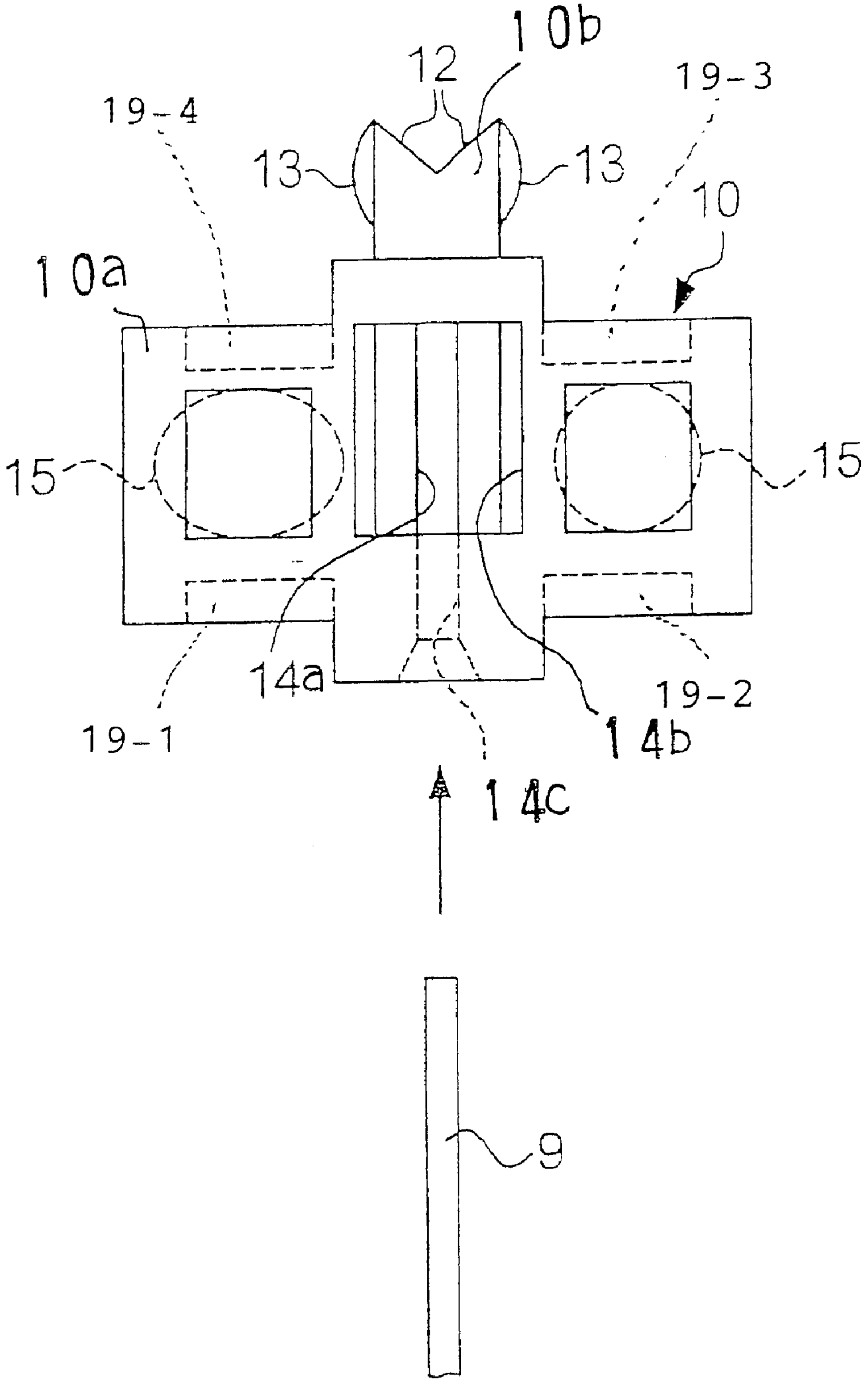
FIG. 7 is a plane view showing the head body.

FIGS. 6 and 7 show the sensor head 3*a*. The sensor head 3*a* is separable into two parts 10 and 11. The parts 10 and 11 are hereinbelow referred to as "head body" and "holder", respectively. The head body 10 and the holder 11 are formed of transparent synthetic resin such as, for example, acrylic resin, and the transparent synthetic resin has the refractive index equal to or close to the refractive index of the optical fiber 9 of the bundle 3*b*.

The head body 10 has a generally rectangular parallelepiped bulk portion 10*a* and a neck portion 10*b*. The neck portion 10*b* projects from a front surface of the bulk portion 10*a*, and is partially cut away for forming a notch. The notch defines reflection surfaces 12, and lenses 13 are fixed to the side surfaces of the neck portion 10*b*. Reflection surfaces 12 form an internal angle of 90 degrees so that the total reflection takes place on the reflection surfaces 12. A light beam propagated through the neck portion 10*b* is reflected on the reflection surfaces 12, and is split into two sub-beams. The sub-beams are directed in the lateral direction, and are incident onto the lenses 13, respectively.

The bulk portion 10*a* is formed with a guide groove 14*a*, a rectangular recess 14*b*, a through-hole 14*c*, recesses 15 and two pairs of rectangular caves 19-1, 19-2, 19-3 and 19-4. The guide groove 14*a* and the through-hole 14*c* extend in the perpendicular direction, and are aligned with one another. The through-hole 14*c* is as thick as the optical fiber 9, and is open to the rear surface of the bulk portion 10*a*. The guide groove 14 has the width equal to the diameter of the optical fiber 9, and is open to the bottom surface of the rectangular recess 14*b*, which in turn is open to the upper surface of the bulk portion 10*a*. The centerlines of the guide groove/the through-hole 14*a*/14*c* are aligned with the bisector of the internal angle between the reflection surfaces 12. For this reason, when the optical fiber 9 is inserted into the guide groove 14*a* via through-hole 14*c*, the optical fiber 9 radiates the light toward the reflection surfaces 12.

On the other hand, the recesses 15 are open to the reverse surface of the bulk portion 10*a*. Though not shown in the drawings, projections are formed on the flat portion 2*b* of the base plate 2, and have configurations corresponding to the spaces defined in the recesses 15. For this reason, when the head body 10 is assembled with the base plate 2, the worker firstly aligns the projections with the recesses 15, and presses the head body 10 against the flat portion 2. The projections are snugly received into the recesses 15, and the head body 10 is fixed onto the flat portion 2. The projections and the recesses 15 exactly locate the head body 10 at an appropriate position with respect to the slit 6.

The rectangular caves 19-1 and 19-2 are open to the rear surface of the head body 10, and the other rectangular caves 19-3 and 19-4 are open to the front surface of the head body 10. The rectangular caves 19-1 and 19-2 are respectively paired with the rectangular caves 19-4 and 19-3, and are aligned with the rectangular caves 19-4 and 19-3, respectively. The two pairs of rectangular caves 19-1/19-4 and 19-2/19-3 are used for assemblage between the head body 10 and the holder 11 as will be described hereinlater in detail.

The holder 11 has a plate portion 11*a*, a pusher 16, two pairs of small hooks 17 and three large hooks 18. The plate portion 11*a* has a rectangular parallelepiped configuration, and the pusher 16 downwardly projects from the central area of the lower surface of the plate portion 11*a*. The small hooks 17 and the large hooks 18 are resiliently deformable. The two pairs of small hooks 17 are arranged around the pusher 16, and downwardly projects from the lower surface of the plate portion 11*a*. The pusher 16 has a rectangular parallelepiped configuration, and is snugly received in the rectangular recess 14*b*. The height of the pusher 16 is approximately equal to the depth of the rectangular recess 14*b*. The small hooks 17 have respective boss portions and respective wedges, and the wedges have slant surfaces opposed to one another. The distance between the boss portions of the small hooks 17 is approximately equal to the distance between the front surface and the rear surface of the head body 10, and the step between the inner surface of the boss portion and the slant surface is approximately equal to the depth of the associated cave 19-1/19-2/19-3/19-4. When a worker makes the holder 11 retain the head body 10, the worker aligns the pusher 16 with the rectangular recess 14*b*. The lower edges of the slant surfaces are disposed at both end lines of the upper surface of the head body 10. Then, the worker pushes the holder 11 toward the head body 10. The boss portions are resiliently deformed outwardly, and permit the slant surfaces to downwardly slide on the front/rear surfaces of the head body 10. When the wedges reach the rectangular caves 19-1/19-2/19-3/19-4, the boss portions return, and wedges are pushed into the rectangular caves 19-1/19-2/19-3/19-4, respectively. The pusher 16 is snugly received in the rectangular recess 14*b*.

Similarly, the large hooks 18 have respective boss portions and respective wedges. However, the slant surfaces of the wedges are outwardly directed as shown. Plural sets of through-holes 2*c* are formed in the flat portion 2*b* of the base plate 2 (see FIG. 6) at intervals, and each set is constituted by three through-holes 2*c*. The three through-holes 2*c* are located in such a manner as to correspond to the large hooks 18. The distance between two large hooks 18 and the remaining large hook 18 is approximately equal to the two corresponding through-holes 2*c* and the remaining through-hole 2*c*. For this reason, when the worker assembles the holder 11 with the base plate 2, the worker aligns the large hooks 18 with the through-holes 2*c* of the associated set, and pushes the holder 11 to the base plate 2. The boss portions are inwardly deformed, and permit the wedges to pass through the through-holes 2*c*. The boss portions return, and the wedges are engaged with the flat portion 2*b* of the base plate 2.

The array of optical fiber sensors 1 is installed in the acoustic piano 70 as follows. First, the photo-filter plates 5 are fixed to the hammer shanks 4*a*, respectively. Subsequently, the base plate 2 is bolted to the shank flange rail 8*a*. Then, the photo-filter plates 5 project through the slits 6, and exposed to the space over the base plate 2. The bundle 3*b* of the optical fibers is connected at one end thereof to the combined optical elements 3*c*, and the other end is led to the base plate 2. In this instance, the combined optical elements 3*c* are respectively connected to the optical fibers 9.

The recesses 15 of each head body 10 are aligned with the associated projections, and are pushed thereinto. Namely, the head bodies 10 are fixed onto the flat portion 2*b* of the base plate 2. One of the optical fibers 9 is inserted through the through-hole 14*c* into the guide groove 14*a* of the associated head body 10, and the leading end of the optical fiber 9 is brought into contact with the inner surface defining the part of the rectangular recess 14*b*.

Subsequently, the large hooks 18 of the associated holder 11 are aligned with the through-holes 2*c*. Then, the pusher 16 and the small hooks 17 of the associated holder 11 are automatically aligned with the rectangular recess 14*b* and the front/rear edges of the head body 10, respectively. The holder 11 is pushed down. Then, the large hooks 18 and the small hooks 17 are deformed so that the wedges of the large hooks 18 and the wedges of the small hooks 17 are engaged with the base plate 2 and the head body 10, respectively. The optical fiber 9 in the guide groove 14*a* is pressed against the head body 10 by means of the pusher 16, and is fixed to the head body 10.

The above-described assembling work is repeated for the sensor heads 3*a*, and the optical fibers 9 of the bundle 3*b* are respectively fixed to the sensor heads 3*a*. Finally, a photo-shield suitable cover plate (not shown) is assembled with the base plate 2, and the sensor heads 3*a* are accommodated in the inner dark space defined by the base plate 2 and the cover plate.

As will be understood, the optical fibers 9 are pinched between the head bodies 10 and the holders 11, and any adhesive compound is not required for the assembling work. The assembling work is speedy, and is completed within a short time period. As a result, the production cost is reduced.

The array of optical fiber sensors 1 monitors the hammers 4 as follows. The data processing system 72*a* sequentially energizes the combined optical elements 3*c*. As described hereinbefore, when the light is radiated from the leading end of one of the optical fiber 9, the light is split into two rays on the reflecting surfaces 12, and parallel rays are laterally radiated through the lenses 13 toward the photo-filter plates 5 on both sides thereof. In other words, it is possible for each sensor head 3*a* to receive two parallel rays from the sensor heads 3*a* on both sides thereof If both parallel rays are concurrently incident on the sensor head 3*a*, it is impossible to separate the incident light into two parts corresponding to the two parallel rays. For this reason, the data processing system 72*a* selects the combined optical elements 3*c* to be energized in such a manner that any sensor head 3*a* does not concurrently receive the parallel rays from the sensor heads 3*a* on both sides thereof. When every third sensor head may laterally radiate the parallel rays toward the sensor heads on both sides thereof, each of the sensor heads receives the parallel ray from either right or left sensor head 3*a*.

Let us focus out attention on one of the combined optical elements 3*c*, the combined optical element 3*c* emits the light, and the light is propagated through the optical fiber 9 to the associated sensor head 3*a*. The light is radiated from the leading end of the optical fiber 9, and is incident on the reflection surfaces 12 of the neck portion forming a part of the associated sensor head 10. The light is split into two beams, and the two beams are directed to the lenses 13. The lenses make the two beams parallel, and the parallel rays pass the photo-filter plates 5 on both sides thereof. As described hereinbefore, the gray scale is formed on each of the photo-filter plates 5, and, accordingly, the transmittance is varied depending upon the angular position of the associated hammer 4. Thus, the parallel rays are modulated with the photo-filter plates 5, and are incident on the adjacent sensor heads 3, respectively.

Each of the modulated parallel rays passes through the lens 13, and is reflected on the reflection surface 12. The modulated ray is condensed onto the leading end of the optical fiber 9. Thus, the modulated rays are respectively incident on the leading ends of the optical fibers 9 connected to the adjacent sensor heads 3*a*.

The modulated rays are propagated through the optical fibers 9, and reach the combined optical elements 3*c*. The combined optical elements 3*c* generate photo-current, the amount of which is proportional to the light intensity of the modulated rays. The combined optical elements 3*c* may convert the photo current to the potential levels. The combined optical elements 3*c* report the current positions of the hammers 4 to the data processing system 72*a* through the hammer position signals, and the data processing system 72*a* fetches the pieces of positional data information after a suitable analog-to-digital conversion.

As will be understood, only one combined optical element is required for a hammer 4. Thus, the combined optical elements 3*c* are reduced to a half of those incorporated in the array of the prior art optical fiber sensors.

Second Embodiment

Figure 8:
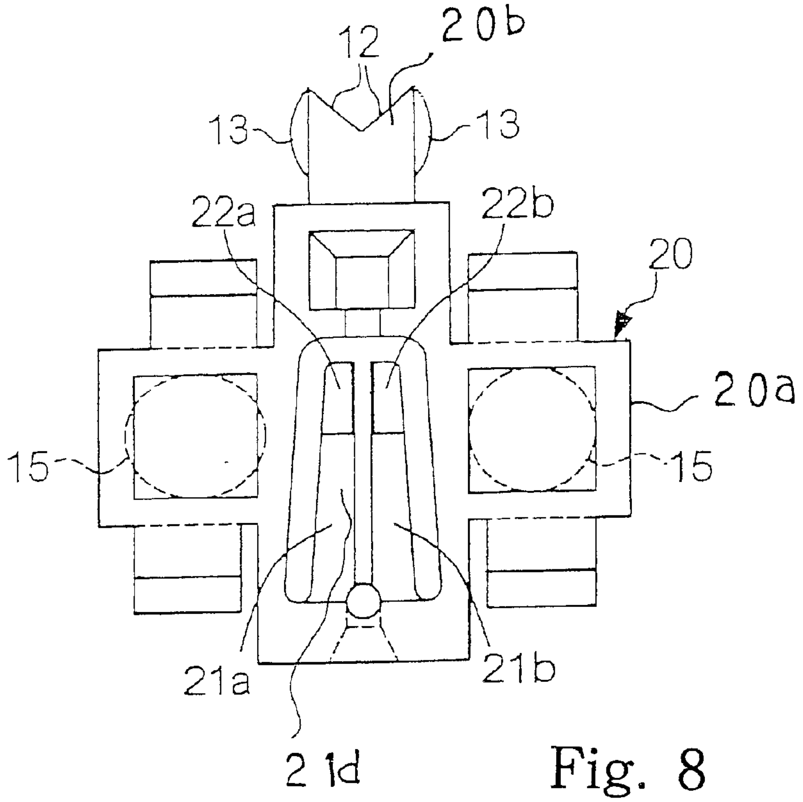
FIG. 8 is a plane view showing a sensor head of incorporated in another optical fiber sensor according to the present invention.
Figure 9:
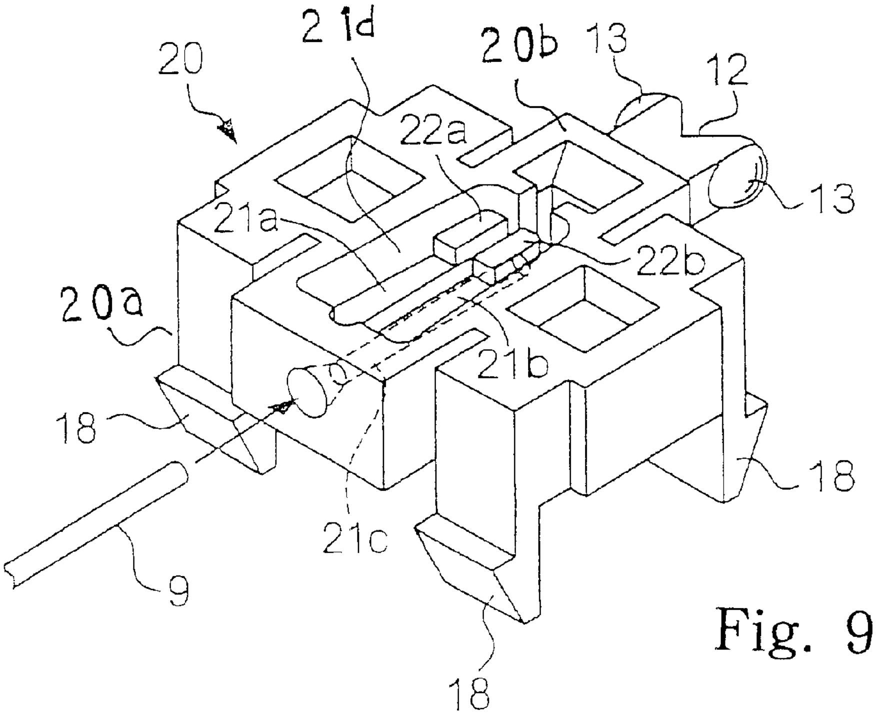
FIG. 9 is a perspective view showing the structure of the sensor head.

Turning to FIGS. 8 and 9 of the drawings, another sensor head 20 forms a part of an optical fiber sensor, which is employed in another automatic player piano embodying the present invention. The sensor head 20 is monolithic body, and is never separated into plural parts such as the head body 10 and the holder 11. The automatic player piano implementing the second embodiment is similar to the first embodiment except the optical fiber sensors, and description is focused on the optical fiber sensors for avoiding undesirable repetition.

The array of the optical fiber sensors also include the array of sensor heads 20, the bundle of optical fibers 3*b*, the combined optical elements 3*c* and the photo-filter plates 5. The combined optical elements 3*c* and the bundle of optical fibers 3*b* are similar to those of the array of optical fiber sensors 1. The sensor heads 20 are fixed onto the flat portion of the base plate 2.

The sensor head 20 is formed of transparent synthetic resin such as, for example, acrylic resin, and has a head body portion 20*a*, a neck portion 20*b* and two pairs of hooks 18. The transparent synthetic resin has a refractive index approximately equal or close to that of the optical fibers. The neck portion 20*b* projects from the front surface of the head body portion 20*a*, and a notch is formed in the neck portion 20*b*. The notch defines two reflection surfaces 12, which form an inner angle of 90 degrees as similar to the neck portion 10*b*. Lenses 13 are formed on the side surfaces of the neck portion 20*b*, and are integral with the neck portion 20*b*. The lenses 13 are directed in the lateral direction, and produce parallel rays.

A tunnel 21*c* is formed in the head body portion 20*a*, and extends in the perpendicular direction. The tunnel 21*c* is aligned with the bisector line of the inner angle between the reflection surfaces 12. The tunnel 21*c* is open to the rear surface of the head body portion 20*a*. The head body portion 20*a* has a pair of fin portions 21*a* and 21*b*, and a pair of lugs 22*a*/22*b* are formed on the fin portions 21*a*/21*b*, respectively. The pair of fin portions 21*a*/21*b* are resiliently deformable. The fin portions 21*a*/21*b* partially define the upper portion of the tunnel 21*c*, and are exposed to a wide recess 21*d*. A worker can access the lug portions 22*a*/22*b* with his fingers through the wide recess 21*d*. If the lug portions 22*a*/22*b* are pushed in the direction spaced from each other, the fin portions 21*a*/21*b* are deformed in such a manner that the tunnel 21*c* becomes wide enough to pass the optical fiber 9.

The head body portion 20*b* is further formed with recesses 15, and corresponding projections are formed on the upper surface of the flat portion 2*b*. The recesses 15 cooperate with the projections so as to locate the sensor head 20 at an appropriate position. The two pairs of hooks 18 downwardly project from the head body portion 20*a*. Though not shown in the drawings, two pairs of through-holes are formed in the flat portion 2*b* of the base plate 2 for each sensor head 20, and the hooks 18 are engageable with the flat portion 2*b*.

The array of optical fiber sensors is installed in the acoustic piano 70 as follows. First, the photo-filter plates 5 are fixed to the hammer shanks 4*a*, respectively, and the base plate 2 is bolted to the shank flange rail 8*a*. Then, the photo-filter plates 5 pass the associated slits 6, and exposed to the space over the base plate 2. The bundle 3*b* of the optical fibers 9 is connected at one end thereof to the combined optical elements 3*c*, and the other end is led in the vicinity of the base plate 2.

Subsequently, a worker picks up one of the sensor heads 20, and pushes the lug portions 22*a*/22*b*. The fin portions 21*a*/21*b* are resiliently deformed so as to widen the tunnel 21*c*. The worker inserts the optical fiber 9 into the tunnel 21*c* until the leading end is brought into contact with the inner surface of the sensor head 20. The worker releases the lug portions 22*a*/22*b*. Then, the fin portions 21*a*/21*b* resiliently return, and press the optical fiber 9 against the head body portion 20*a*.

The worker aligns the projections with the recesses 15. Then, the hooks 18 are aligned with the through-holes. The worker presses the sensor head 20 against the flat portion 2*b* of the base plate 2. The hooks 18 are resiliently deformed, and permit the wedges to pass the through-holes. The projections are snugly received in the recesses 15, and the lenses 13 are appropriately directed to the associated photo-filter plates 5. The hooks 18 resiliently return, and the wedges fix the head body portion 20*a* to the flat portion 2*b* of the base plate 2.

The above-described assembling work is repeated for the remaining sensor heads 20 and the associated optical fibers 9.

As will be understood, the fin portions 21*a*/21*b* resiliently press the optical fiber 9 to the head body portion 20*a*, and any adhesive compound is not required for the assemblage between the sensor head 20 and the optical fiber 9. The assembling work does not consume a long time, and the production cost is reduced.

Third Embodiment

Figure 10:
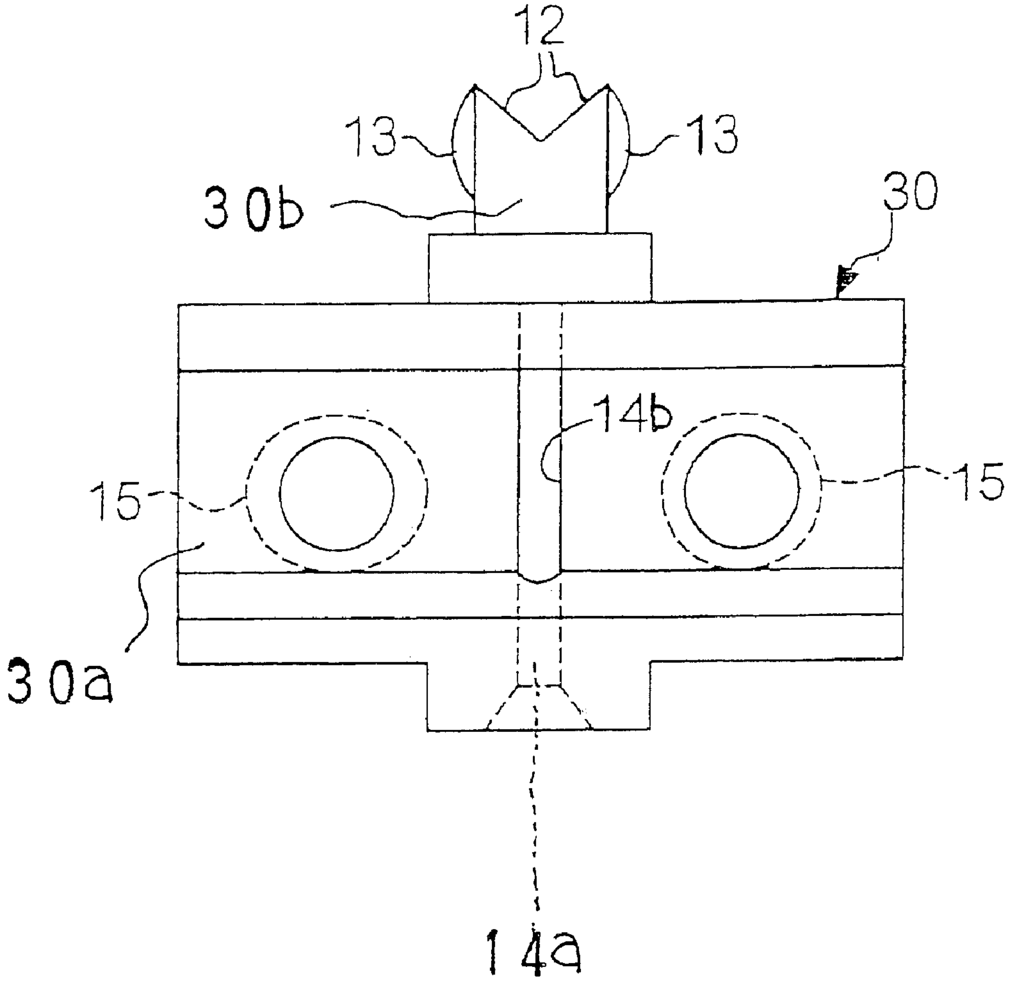
FIG. 10 is a plane view showing a sensor head incorporated in yet another optical fiber sensor according to the present invention.

FIG. 10 shows a sensor head 30 employed in yet another automatic player piano embodying the present invention. The automatic player piano implementing the third embodiment is similar to the first embodiment except the optical fiber sensors, and description is focused on the optical fiber sensors for avoiding undesirable repetition.

The array of the optical fiber sensors also include an array of sensor heads 30, the bundle of optical fibers 3*b*, the combined optical elements 3*c*, the photo-filter plates 5 and a clamper 31. The combined optical elements 3*c* and the bundle of optical fibers 3*b* are similar to those of the array of optical fiber sensors 1. The sensor heads 20 are fixed onto the flat portion of the base plate 2 by means of the clamper 31.

The sensor head 30 has a head body portion 30*a* and a neck portion 30*b*. The neck portion 30*b* projects from the front surface of the head body portion 30*a*, and a notch is formed. The notch defines reflection surfaces 12 as similar to that of the first embodiment, and lenses 13 are formed on the side surfaces of the neck portion 30*b*.

The head body portion 30*a* is formed with a through-hole 14*a* and a guide groove 14*b*. The centerlines of the through-hole/guide groove 14*a*/14*b* are aligned with the bisector line of the inner angle between the reflection surfaces 12. The through-hole 14*a* is open to the rear surface of the head body portion 30*a*, and is as thick as the optical fiber 9. The guide groove 14*b* is exposed to the upper surface of the head body portion 30*a*, and the depth of the guide groove 14*b* is less than the diameter of the optical fiber 9.

Figure 11:
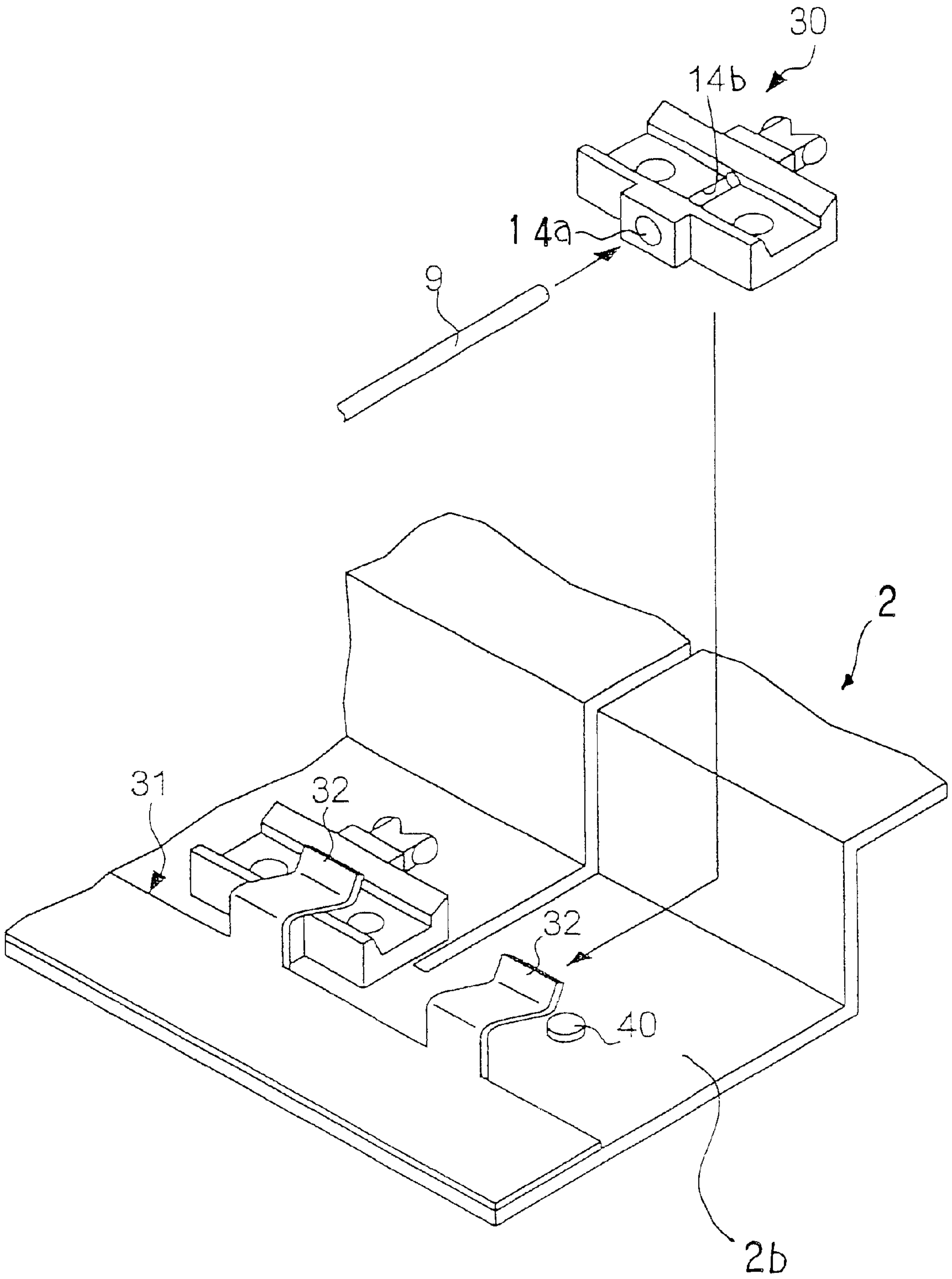
FIG. 11 is a perspective view showing an assembling work on the sensor head.

The head body portion 30*a* is further formed with recesses 15, and projections 40 (see FIG. 11) are snugly received in the recesses 15. The projections 40 and the recesses 15 locate the sensor head 30 at an appropriate position so that the lenses 13 are directed to the associated photo-filter plates 5 on both sides thereof.

The clamper 31 is implemented by a metal plate. Tongues 32 are raised from the flat portion 2*b* of the base plate 2 at intervals, and the intervals are approximately equal to the intervals of the sensor heads 30 appropriately located on the flat portion 2*b* of the base plate 2. The tongues 32 are elastically deformable, and the leading end portions of the tongues 32 are bend upwardly. When the optical fiber 9 is inserted into the guide groove 14*b*, the distance between the back surface of the head body portion 30*a* and the peak of the optical fiber 9 is slightly greater than the distance between the upper surface of the flat portion 2*b* and the bent portion of the tongue 32.

The array of optical fiber sensors is installed in the acoustic piano 70 as follows. First, the photo-filter plates 5 are fixed to the hammer shanks 4*a*, respectively, and the base plate 2 is bolted to the shank flange rail 8*a*. Then, the photo-filter plates 5 pass through the slits 6, and are exposed to the space over the flat portion 2*b*. The bundle 3*b* of the optical fibers 9 is connected at one end thereof to the combined optical elements 3*c*, and the other end portions are led to the space over the flat portion 2*b*.

A worker aligns one of the optical fibers 9 with the through-hole 14*a*, and inserts the optical fiber 9 into the guide groove 14*b* via through-hole 14*a* until the leading end is brought into contact with the inner surface defining the guide groove 14*b*. The worker pinches the tongue 32 with his fingers, and moves upwardly. The tongue 32 is elastically deformed, and makes the gap wider. The worker brings the sensor head 30 into the gap, and aligns the projections 40 with the recesses 15. The sensor head 30 is pressed against the flat portion 2*b* of the base plate 2, and the projections 40 are snugly received in the recesses 15. The worker releases the tongue 32. Then, the tongue elastically returns, and presses the optical fiber 9 against the head body portion 30*a*. The sensor head 30 is pinched between the flat portion 2*b* and the tongue 32, and the projections 40 and the recesses 15 do not permit the sensor head 30 to laterally move on the flat portion 2*b*.

As will be understood, the optical fiber 9 is pinched between the sensor head 30 and the tongue 32, and any adhesive compound is not required for the assemblage. The worker can complete the assembling work without a long time period, and the production cost is reduced.

Fourth Embodiment

Figure 12:
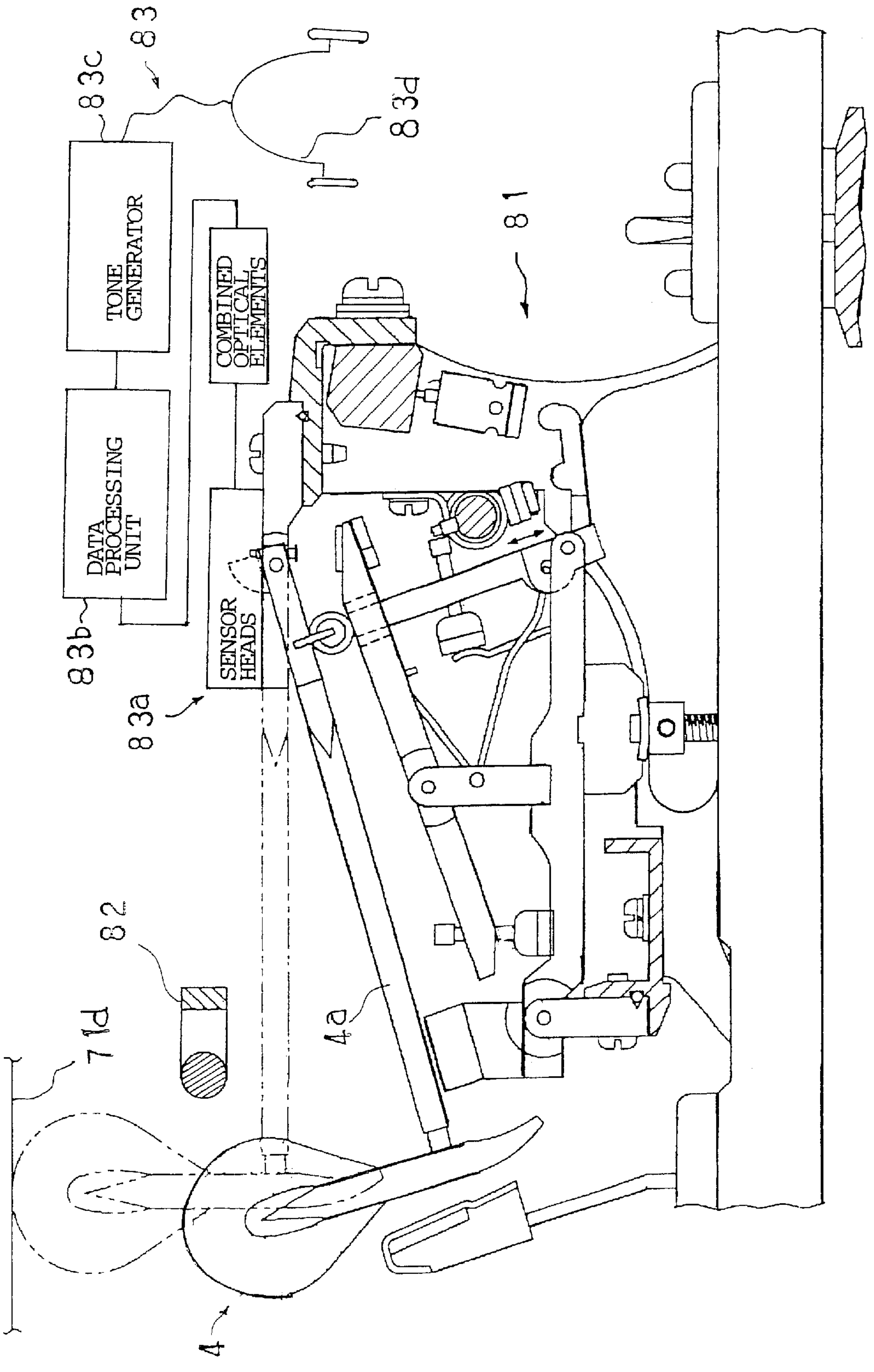
FIG. 12 is a side view showing the structure of a silent piano according to the present invention.

Turning to FIG. 12 of the drawings, a silent piano embodying the present invention largely comprises an acoustic piano 81, a hammer stopper 82 and an electronic tone generating system 83. The acoustic piano is similar to the acoustic piano 70, and the hammer stopper 82 is changeable between a free portion and a blocking position. The hammer stopper 82 at the free position is out of the trajectories of the hammer shanks 4*a*, and the hammer assemblies 4 strike the associated strings 71*d* without any interruption of the hammer stopper 82. On the other hand, when the hammer stopper 82 is rotated in the clockwise direction over 90 degrees, the hammer stopper 82 enters the trajectories of the hammer shanks 4*a*, and is changed to the blocking position. While a pianist is playing a tune on the keyboard, the depressed keys make the associated action mechanisms to escape from the hammer assemblies 4. However, the hammer shanks 4*a* rebound on the hammer stopper 82 before striking the strings 71*d*. Thus, the pianist can practice the fingering without any piano tone.

The electronic tone generating system 83 includes hammer sensors 83*a*, a data processing unit 83*b*, a tone generator 83*c* and a headphone 83*d*. The data processing unit 83*b*, the tone generator 83*c* and the headphone 83*d* are similar to those of the prior art silent piano, and no further description is incorporated hereinbelow.

The array of hammer sensors 83*a* is implemented by the optical fiber sensors embodying the present invention. Any kind of the optical fiber sensors implementing the first to third embodiments is available for the silent piano. For this reason, detailed description is omitted for the sake of simplicity.

The array of the optical fiber sensors achieves all the advantages of the first to third embodiments.

Fifth Embodiment

Figure 13:
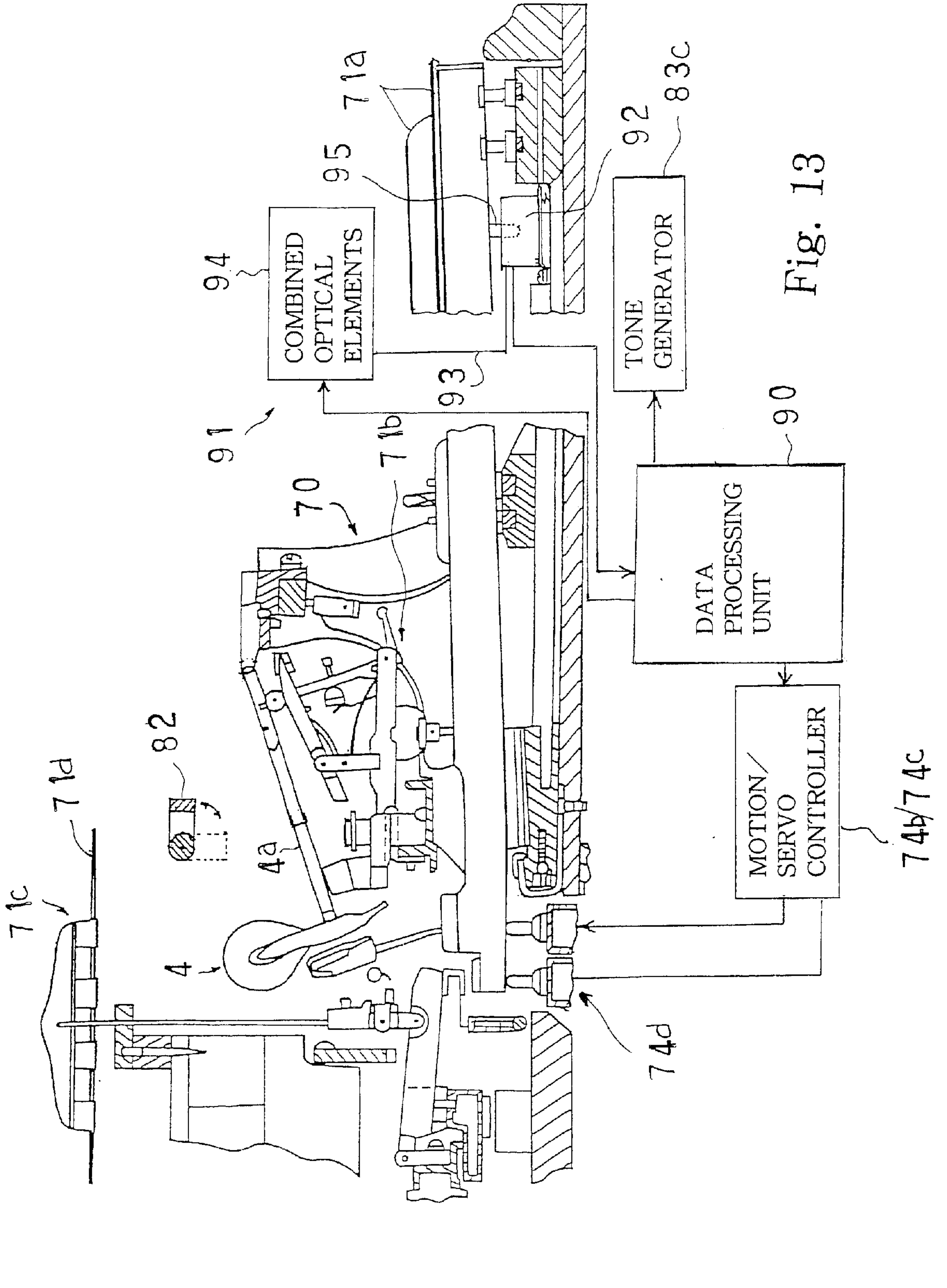
FIG. 13 is a side view showing the structure of a composite keyboard musical instrument according to the present invention.

FIG. 13 shows a composite keyboard musical instrument embodying the present invention. The composite keyboard musical instrument is a compromise between the automatic player piano and the silent piano. For this reason, parts of the composite keyboard musical instrument are labeled with the references designating the corresponding parts of the automatic player/silent pianos described hereinbefore without detailed description. The data processing system 72*a* and the data processing unit 83*c* is replaced with a data processing unit 90 so as to make the circuit arrangement simple.

The composite keyboard musical instrument has an array of key sensors 91 instead of the array of hammer sensors 1/83*a*, and the array of key sensors 91 reports the current positions of the black/white keys 71*a* to the data processing unit 90. The data processing unit 90 analyzes the current key positions, and produces the music data codes.

The array of key sensors 91 is implemented by optical fiber sensors according to the present invention. The array of optical fiber sensors includes sensor heads 92, a bundle of optical fibers 93, combined optical elements 94 and photo-filter plates 95. Any kind of the sensor heads implementing the first to third embodiments is available for the array of key sensors 91. In other words, the sensor heads shown in one of FIG. 6, 9 or 10 are used as the sensor heads 92. The combined optical elements 94 are connected through the optical fibers to the sensor heads 92, respectively. The combined optical element 94 emits light, and converts the incident light to photo current as similar to those incorporated in the first to third embodiments.

The photo-filter plates 95 are respectively fixed to the lower surfaces of the black/white keys 71*a*, and the gray code is formed on each of the photo-filter plate 95. The sensor heads 92 are laterally arranged at intervals, and the parallel rays radiated to the adjacent sensor heads 92 cross the photo-filter plates 95. For this reason, when the black/white keys 71*a* are moved between the rest positions and the end positions, the amount of transmitted light is varied depending upon the current key positions.

The optical fiber sensors 91 achieve all the advantages of the optical fiber sensors incorporated in the first to third embodiments.

In the above-described embodiments, the combined optical element 3*c* serves as a converting unit, and the optical fiber 9 is corresponding to the optical guide member. The sensor head 3*a*/20/30 serves as a sensor head unit, and the photo-filter plate 5/95 serves as an optical element.

As will be appreciated from the foregoing description, the optical fiber is pinched between the parts 10/11, 20*a*/21*a*/21*b* or 30*a*/32 of the sensor head 3*a*, 20 or 30. The assembling worker can complete the assembling work within a short time period, and any adhesive compound is not required. This result in reduction in the production cost of the composite keyboard musical instrument.

Although particular embodiments of the present invention have been shown and described, it will be apparent to those skilled in the art that various changes and modifications may be made without departing from the spirit and scope of the present invention.

An array of the optical fiber sensors according to the present invention may be applied to another kind of composite keyboard musical instrument such as, for example, a practice keyboard, in which the strings are replaced with an impact absorber so that a trainee practices fingering on the keyboard without any piano tone.

The optical fiber sensor according to the present invention may be incorporated in other kinds of musical instrument such as, for example, an electric keyboard, electronic stringed instrument and electronic window instrument.

The recesses 15 and the projections may be exchanged. In this instance, the projections are formed on the back surface of the head body 10, and the recesses 15 are formed in the flat portion 2.

A sheet of resilient material such as, for example, rubber may be inserted between the optical fiber 9 and the parts 10/11, 20*a*/21*a*/21*b* or 30*a*/32 of the sensor head 3*a*, 20 or 30.

A sensor head according to the present invention may be connected to a plurality of optical fibers by means of the parts such as those 10/11, 20*a*/21*a*/21*b* or 30*a*/32. In this instance, the plurality of optical fibers serves as the optical guide member.

A sensor head according to the present invention may radiate only one light beam and receive only one light beam. Otherwise, a sensor head according to the present invention may only radiate light beams, which are received by other sensor heads according to the present invention. In this instance, the sensor head for radiating the light beam and the other sensor head for receiving the light beam form in combination a sensor head unit.

In the above-described embodiment, the photo-filter plate is fixed to the hammer or key. Any kind of optical element is available for the optical fiber sensor according to the present invention in so far as the optical element varies an optical property depending upon the current position of the hammer/key. For example, a reflecting plate may be fixed to the hammer/key so that the amount of reflection is varied depending upon the current position. Another optical element may vary the chrominance.

What is claimed is:

1. An optical sensor for converting a current position of a moving object to an electric signal, comprising:

a converting unit generating a light, and converting an incident light to said electric signal;

an optical guide member connected at one end thereof to said converting unit, and propagating said light and said incident light between said one end and the other end thereof;

a sensor head unit connected to said other end of said optical guide member for radiating said light along an optical path and receiving said incident light, and having a first portion formed with a guide path which receives a part of said optical guide member and a second portion pinching said part of said optical guide member together with said first portion; and an optical element fixed to said moving object, and moved together with said moving object in such a manner as to cross said optical path for varying the amount of an optical property of said incident light depending upon said current position of said moving object.

2. The optical sensor as set forth in claim 1, in which said first portion and said second portion are respectively formed by a head body and a holder separable from each other.

3. The optical sensor as set forth in claim 2, in which said head body and said holder are respectively further formed with a recess and a projection snugly received into said recess, and said guide path8 is a groove exposed to a bottom surface defining said recess so that said optical guide member is pressed to said head body with said projection.

4. The optical sensor as set forth in claim 3, in which one of said head body and said holder is further formed with hooks engaged with the other of said head body and said holder so that said hooks keep said optical guide member pinched between said head body and said holder.

5. The optical sensor as set forth in claim 4, in which said other of said head body and said holder is further formed with recesses for receiving said hooks.

6. The optical sensor as set forth in claim 1, in which said first portion and said second portion are respectively formed by a head body portion and a resiliently deformable member connected to said head body portion, and said guide path is defined partially by said head body portion and partially by said resiliently deformable member so that said optical guide member is resiliently pinched between said head body and said resiliently deformable member.

7. The optical sensor as set forth in claim 6, in which said guide path is a groove exposed to a bottom surface of a recess defined by an inner surface of said head body portion, and said resiliently deformable member is implemented by resiliently deformable fins projecting from said inner surface into said groove.

8. The optical sensor as set forth in claim 1, in which said first member and said second member are respectively formed by a head body portion to be mounted on a stationary plate and an elastically deformable member fixed to said stationary plate, and said guide path is a groove exposed to an upper surface of said head body portion and having a depth less than a thickness of said optical guide member so that said optical guide member in said guide path is pressed to said head body portion by said elastically deformable member when said head body portion is mounted on said stationary plate.

9. The optical sensor as set forth in claim 8, further comprising a locating member for locating said head body portion at an area on said stationary plate under said elastically deformable member.

10. The optical sensor as set forth in claim 9, in which said locating member is implemented by at least one projection formed on one of said stationary plate and said head body portion and at least one recess formed on the other of said stationary plate and said head body portion for snugly receiving said at least one projection.

11. The optical sensor as set forth in claim 1, in which said sensor head unit is formed of transparent material permitting said light and said incident light to be propagated therethrough, and has a bulk portion formed with said guide path and a neck portion projecting from said bulk portion and formed with reflecting surfaces located on a virtual extension line of said guide path so as to split said light into two rays and direct said incident light to said other end of said optical guide member.

12. The optical sensor as set forth in claim 11, in which said neck portion is further formed with lenses for producing parallel rays from said two rays.

13. The optical sensor as set forth in claim 11, in which said sensor head is arranged on a stationary plate together with sensor heads similar in structure to said sensor head and located on both sides thereof, wherein said two rays are concurrently incident on said sensor heads and said incident light is radiated fro one of said sensor heads.

14. The optical sensor as set forth in claim 13, in which said sensor head an one of said sensor heads further have locating members for locating said sensor h2ead and one of said sensor heads at predetermined positions on both sides of a trajectory of said optical element.

15. The optical sensor as set forth in claim 14, in which each of said locating member is implemented by at least one projection formed on one of said stationary plate and the sensor head and at least one recess formed on the other of said stationary plate and said sensor head for snugly receiving said at least one projection.

16. The optical sensor as set forth in claim 13, in which said sensor head and said sensor heads further have a clamper and clampers for fixing said sensor head and said sensor heads to said stationary plate.

17. The optical sensor as set forth in claim 16, in which said clamper is implemented by through-holes formed in said stationary plate and hooks projecting from said sensor head and passing said through-holes for clamping said stationary plate.

* * * * *